US012339438B2

(12) United States Patent
Aoshima

(10) Patent No.: US 12,339,438 B2
(45) Date of Patent: Jun. 24, 2025

(54) MICROMIRROR DEVICE AND OPTICAL SCANNING DEVICE

(71) Applicant: FUJIFILM Corporation, Tokyo (JP)

(72) Inventor: Keisuke Aoshima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 506 days.

(21) Appl. No.: 17/901,090

(22) Filed: Sep. 1, 2022

(65) Prior Publication Data

US 2023/0074021 A1    Mar. 9, 2023

(30) Foreign Application Priority Data

Sep. 8, 2021    (JP) ................................ 2021-146276

(51) Int. Cl.
*G02B 26/08*      (2006.01)
*G02B 26/10*      (2006.01)

(52) U.S. Cl.
CPC ....... *G02B 26/0858* (2013.01); *G02B 26/101* (2013.01)

(58) Field of Classification Search
CPC .......................... G02B 26/0858; G02B 26/101
See application file for complete search history.

(56) References Cited

U.S. PATENT DOCUMENTS

2010/0253991 A1   10/2010   Yamada
2011/0141538 A1   6/2011   Mizumoto
(Continued)

FOREIGN PATENT DOCUMENTS

JP    2017-132281 A    8/2017
WO   2009/041342 A1    4/2009
(Continued)

OTHER PUBLICATIONS

Extended European Search Report for European Application No. 22192016.8, dated Feb. 1, 2023.
(Continued)

*Primary Examiner* — Euncha P Cherry
(74) *Attorney, Agent, or Firm* — Birch, Stewart, Kolasch & Birch, LLP

(57) ABSTRACT

The micromirror device includes: a mirror portion; a first support portion that swingably supports the mirror portion around a first axis; a pair of movable frames that face each other across the first axis; a second support portion that swingably supports a movable portion around a second axis; a driving portion that surrounds the movable portion and has a gap with the second support portion on the second axis; a coupling portion that couples the second support portion and the driving portion; and a fixed frame, in which, in a state where the mirror portion rotates around the first axis and an absolute value of a rotation angle is larger than 0 degrees, assuming that, in a plane orthogonal to the first axis and including the second axis, a distance between an intersection between the second axis and a straight line located on a surface of the second support portion and including each end point of the second support portion and an end part of the second support portion on a mirror portion side in a stationary state is denoted by A, and a total length of the second support portion in a direction of the second axis is denoted by L, a relationship of $A/L \leq 2/3$ is satisfied.

6 Claims, 19 Drawing Sheets

(56) References Cited

U.S. PATENT DOCUMENTS

| | | |
|---|---|---|
| 2011/0181933 A1 | 7/2011 | Kubo et al. |
| 2017/0210278 A1 | 7/2017 | Matsuno |
| 2017/0343795 A1 | 11/2017 | Grutzeck et al. |
| 2021/0223539 A1* | 7/2021 | Naono ................. G02B 26/101 |

FOREIGN PATENT DOCUMENTS

| | | |
|---|---|---|
| WO | WO 2010/021216 A1 | 2/2010 |
| WO | WO 2010/035759 A1 | 4/2010 |
| WO | WO 2020/085063 A1 | 4/2020 |

OTHER PUBLICATIONS

Japanese Office Action for Japanese Application No. 2021-146276, dated Jan. 21, 2025, with an English translation.

* cited by examiner

FIG. 11

| PARAMETER | SET VALUE |
|---|---|
| Lb1 | 0.790 mm |
| Wb1 | 0.230 mm |
| Lm1 | 0.450 mm |
| Lb2 | 0.490 mm |
| Wb2 | 0.425 mm |
| Lb3 | 0.500 mm |
| Wb3 | 0.215 mm |
| Wm1 | 0.110 mm |
| Wm2 | 0.100 mm |
| $\Delta 1$ | 0.050 mm |
| $\Delta 2$ | 0.040 mm |
| $\Delta 3$ | 0.050 mm |
| $\Delta 4$ | 0.050 mm |
| $\Delta 5$ | 0.060 mm |
| $\Delta 6$ | 0.070 mm |
| $\Delta 7$ | 0.050 mm |
| $\Delta 8$ | 0.065 mm |
| Wac1 | 1.030 mm |
| Wac2 | 0.190 mm |
| Wac3 | 0.220 mm |
| Wac4 | 0.170 mm |
| Xac1 | 2.090 mm |
| Xac2 | VARIABLE |
| Yac1 | 2.090 mm |
| Yac2 | VARIABLE |
| Wrim1 | 0.053 mm |
| $\theta$ rim | 15.5° |

| PARAMETER | SET VALUE |
|---|---|
| Rm | 0.750 mm |
| Lb0 | 0.730 mm |
| Wb0 | 0.220 mm |
| R0 | 0.230 mm |
| R1 | 0.065 mm |
| R2 | 0.075 mm |
| R3 | 0.050 mm |
| $\delta 1$ | 0.040 mm |
| $\delta 2$ | 0.095 mm |
| Wr1 | 0.165 mm |
| Wr2 | 0.125 mm |
| Wr3 | 0.148 mm |
| Xr1 | 1.376 mm |
| Xr2 | 0.990 mm |
| Xr3 | 1.159 mm |
| Wb1 | 0.132 mm |
| Wrim2 | 0.070 mm |
| Wfrm | 0.136 mm |
| Rrim | 0.800 mm |
| Rfrm | 0.870 mm |

FIG. 16

| PARAMETER | SET VALUE |
|---|---|
| Lb1 | 0.800 mm |
| Wb1 | 0.280 mm |
| Lb2 | 0.950 mm |
| Wb2 | 0.300 mm |
| Wm | 0.16 mm |
| $\Delta 1$ | 0.085 mm |
| $\Delta 2$ | 0.050 mm |
| $\Delta 3$ | 0.400 mm |
| $\Delta 4$ | 0.250 mm |
| Wac | 0.160 mm |
| Xac | 2.415 mm |
| Yac | 2.515 mm |
| Wrim1 | 0.05935 mm |
| $\theta$ rim | 12.5° |

| PARAMETER | SET VALUE |
|---|---|
| Rm | 0.750 mm |
| Lb0 | 0.63825 mm |
| Wb0 | 0.185 mm |
| R0 | 0.17608 mm |
| R1 | 0.065 mm |
| R2 | 0.075 mm |
| R3 | 0.050 mm |
| $\delta$ | 0.090 mm |
| Wb | 0.120 mm |
| Wr | 0.120 mm |
| Xr1 | 1.23191 mm |
| Xr2 | 1.02796 mm |
| Xr3 | 1.14471 mm |
| Wrim2 | 0.065 mm |
| Rrim | 0.800 mm |
| Wfrm | 0.130 mm |
| Rfrm | 1.045 mm |

FIG. 17

| SAMPLE NUMBER | Xac2 (mm) | Yac2 (mm) | Lb1 (mm) | A (mm) | A/Lb1 | fr1 (Hz) | fr2 (Hz) | Δfr (Hz) | STABILITY OF TWO-DIMENSIONAL DRIVING | POWER CONSUMPTION (mW) |
|---|---|---|---|---|---|---|---|---|---|---|
| 1 | – | – | 0.80 | 0.16 | 0.20 | 34427 | 34257 | −170 | NG | 3 |
| 2 | 1.39 | 1.44 | 0.79 | 0.23 | 0.30 | 29237 | 29118 | −119 | NG | 9 |
| 3 | 1.48 | 1.62 | 0.79 | 0.30 | 0.38 | 28989 | 28897 | −92 | OK | 15 |
| 4 | 1.57 | 1.79 | 0.79 | 0.43 | 0.54 | 28740 | 28679 | −61 | OK | 30 |
| 5 | 1.66 | 1.83 | 0.79 | 0.52 | 0.66 | 28517 | 28467 | −50 | OK | 41 |
| 6 | 1.75 | 1.87 | 0.79 | 0.61 | 0.77 | 28294 | 28252 | −42 | OK | 52 |
| 7 | 1.84 | 1.90 | 0.79 | 0.70 | 0.89 | 28125 | 28089 | −36 | OK | 60 |

MICROMIRROR DEVICE AND OPTICAL SCANNING DEVICE

CROSS-REFERENCE TO RELATED APPLICATIONS

The present application claims priority under 35 U.S.C. § 119 to Japanese Patent Application No. 2021-146276 filed on Sep. 8, 2021. The above application is hereby expressly incorporated by reference, in its entirety, into the present application.

BACKGROUND

1. Technical Field

The technique of the present disclosure relates to a micromirror device and an optical scanning device.

2. Description of the Related Art

A micromirror device (also referred to as a microscanner) is known as one of micro electro mechanical systems (MEMS) devices manufactured using the silicon (Si) microfabrication technique. Since the micromirror device is small and has low power consumption, it is expected to have a wide range of applications in laser displays, laser projectors, optical coherence tomography, and the like.

There are various drive methods for the micromirror device, and a piezoelectric drive method using deformation of a piezoelectric body is promising since the generated torque is higher than that in other methods and a high scan angle can be obtained. In particular, in a case where a high scan angle is required, such as in a laser display, a higher scan angle can be obtained by resonantly driving the micromirror device of the piezoelectric drive method.

A general micromirror device used in a laser display comprises a mirror portion and a piezoelectric actuator (see, for example, JP2017-132281A and WO2009/041342A). The mirror portion is swingable around a first axis and a second axis that are orthogonal to each other. The actuator allows the mirror portion to swing around the first axis and the second axis according to the driving voltage supplied from the outside. The above-described scan angle corresponds to a deflection angle of the mirror portion.

As performance indicators of the laser display, resolution and viewing angle are mentioned. The resolution and viewing angle are related to a swing frequency and a deflection angle of the mirror portion of the micromirror device. For example, in a laser display of a Lissajous scanning method, two-dimensional optical scanning is performed by allowing the mirror portion to swing sequentially at two different frequencies around the first axis and the second axis. The larger the deflection angle of the mirror portion, the larger the scanning area of light, and the larger the image can be displayed with the shorter optical path length.

SUMMARY

In a general micromirror device, the actuator as a driving portion is directly connected to a fixed frame on the second axis. In this case, in a case where the mirror portion swings around the first axis, the movement of the actuator is greatly restricted, so that a large amount of energy is required to drive the actuator. This causes a decrease in a Q value during driving, and as a result, power consumption increases.

An object of the present disclosure is to provide a micromirror device and an optical scanning device capable of reducing power consumption during two-dimensional driving.

In order to achieve the object, a micromirror device of the present disclosure comprises: a mirror portion on which a reflecting surface for reflecting incident light is formed; a first support portion that is connected to the mirror portion on a first axis located in a plane including the reflecting surface of the mirror portion in a stationary state, and that swingably supports the mirror portion around the first axis; a pair of movable frames that are connected to the first support portion and face each other across the first axis; a second support portion that is connected to the movable frame on a second axis which is located in the plane including the reflecting surface of the mirror portion in the stationary state and is orthogonal to the first axis, and that swingably supports a movable portion including the mirror portion, the first support portion, and the movable frame around the second axis; a driving portion that surrounds the movable portion and has a gap with the second support portion on the second axis; a coupling portion that couples the second support portion and the driving portion; and a fixed frame that is connected to the driving portion and surrounds the driving portion, in which, in a state where the mirror portion rotates around the first axis and an absolute value of a rotation angle is larger than 0 degrees, assuming that, in a plane orthogonal to the first axis and including the second axis, a distance between an intersection between the second axis and a straight line located on a surface of the second support portion and including each end point of the second support portion and an end part of the second support portion on a mirror portion side in the stationary state is denoted by A, and a total length of the second support portion in a direction of the second axis is denoted by L, a relationship of $A/L \leq 2/3$ is satisfied.

It is preferable that the driving portion has a piezoelectric element.

It is preferable that the driving portion includes a pair of first actuators facing each other across the second axis and having a piezoelectric element, and a pair of second actuators surrounding the first actuator, facing each other across the first axis, and having a piezoelectric element.

It is preferable that the second actuator allows the mirror portion to swing around the first axis, and the first actuator allows the movable portion to swing around the second axis.

It is preferable that the distance A and the total length L satisfy a relationship of $19/50 \leq A/L \leq 2/3$.

An optical scanning device of the present disclosure comprises: the micromirror device according to any one of the aspects; and a processor that drives the driving portion, in which the processor allows the mirror portion to swing around the first axis and the second axis by providing a driving signal to the driving portion.

According to the technique of the present disclosure, it is possible to provide a micromirror device and an optical scanning device capable of reducing power consumption during two-dimensional driving.

BRIEF DESCRIPTION OF THE DRAWINGS

Exemplary embodiments according to the technique of the present disclosure will be described in detail based on the following figures, wherein:

FIG. 11 is a diagram showing specific setting values of the parameters, FIG. 16 is a diagram showing specific setting values of the parameters, FIG. 17 is a diagram showing experimental results for each sample.

DETAILED DESCRIPTION

An example of an embodiment relating to the technique of the present disclosure will be described with reference to the accompanying drawings.

Figure 1:
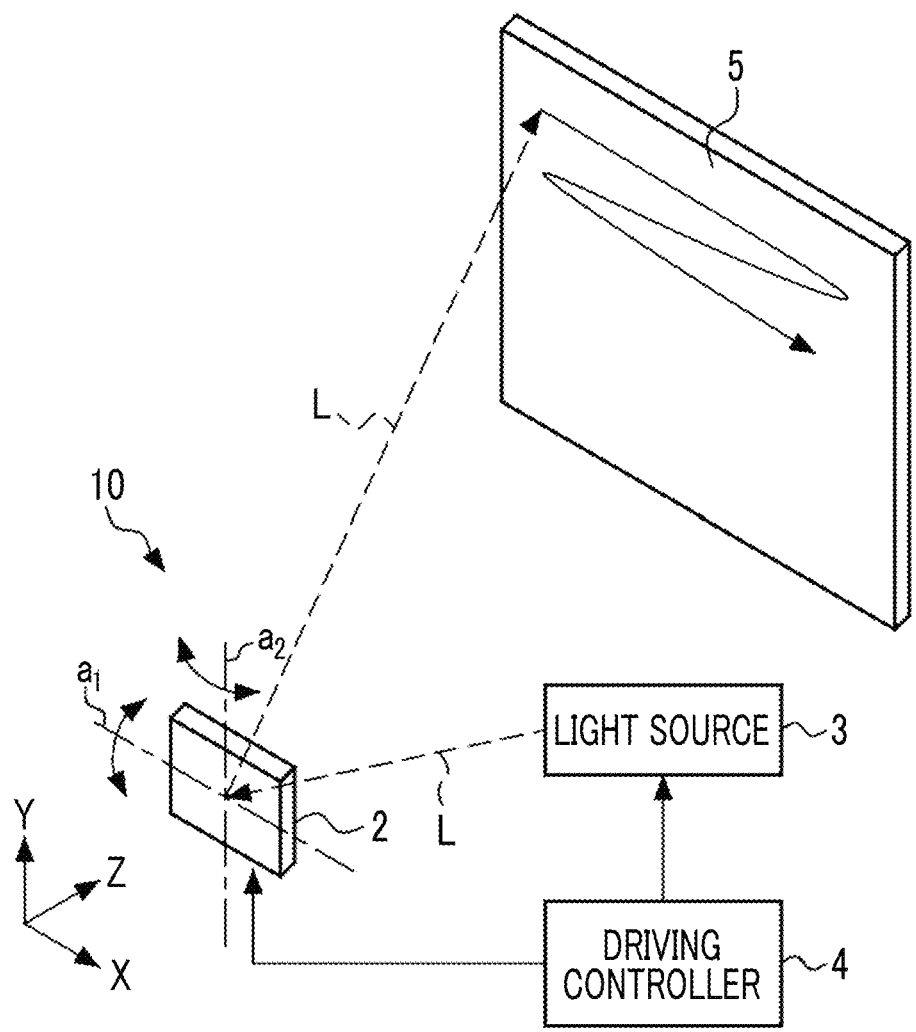
FIG. 1 is a schematic view of an optical scanning device.

FIG. 1 schematically shows an optical scanning device 10 according to an embodiment. The optical scanning device 10 includes a micromirror device (hereinafter, referred to as micromirror device (MMD)) 2, a light source 3, and a driving controller 4. The optical scanning device 10 optically scans a surface to be scanned 5 by reflecting a light beam L emitted from the light source 3 by the MMD 2 under the control of the driving controller 4. The surface to be scanned 5 is, for example, a screen.

The MMD 2 is a piezoelectric biaxial drive type micromirror device capable of allowing a mirror portion 20 (see FIG. 3) to swing around a first axis $a_1$ and a second axis $a_2$ orthogonal to the first axis $a_1$. Hereinafter, the direction parallel to the first axis $a_1$ is referred to as an X direction, the direction parallel to the second axis $a_2$ is a Y direction, and the direction orthogonal to the first axis $a_1$ and the second axis $a_2$ is referred to as a Z direction.

The light source 3 is a laser device that emits, for example, laser light as the light beam L. It is preferable that the light source 3 emits the light beam L perpendicularly to a reflecting surface 20A (see FIG. 3) included in the mirror portion 20 in a state where the mirror portion 20 of the MMD 2 is stationary.

The driving controller 4 outputs a driving signal to the light source 3 and the MMD 2 based on optical scanning information. The light source 3 generates the light beam L based on the input driving signal and emits the light beam L to the MMD 2. The MMD 2 allows the mirror portion 20 to swing around the first axis $a_1$ and the second axis $a_2$ based on the input driving signal.

As will be described in detail below, the driving controller 4 allows the mirror portion 20 to resonate around the first axis $a_1$ and the second axis $a_2$, so that the surface to be scanned 5 is scanned with the light beam L reflected by the mirror portion 20 such that a Lissajous waveform is drawn. This optical scanning method is called a Lissajous scanning method.

The optical scanning device 10 is applied to, for example, a Lissajous scanning type laser display. Specifically, the optical scanning device 10 can be applied to a laser scanning display such as augmented reality (AR) glass or virtual reality (VR) glass.

Figure 2:
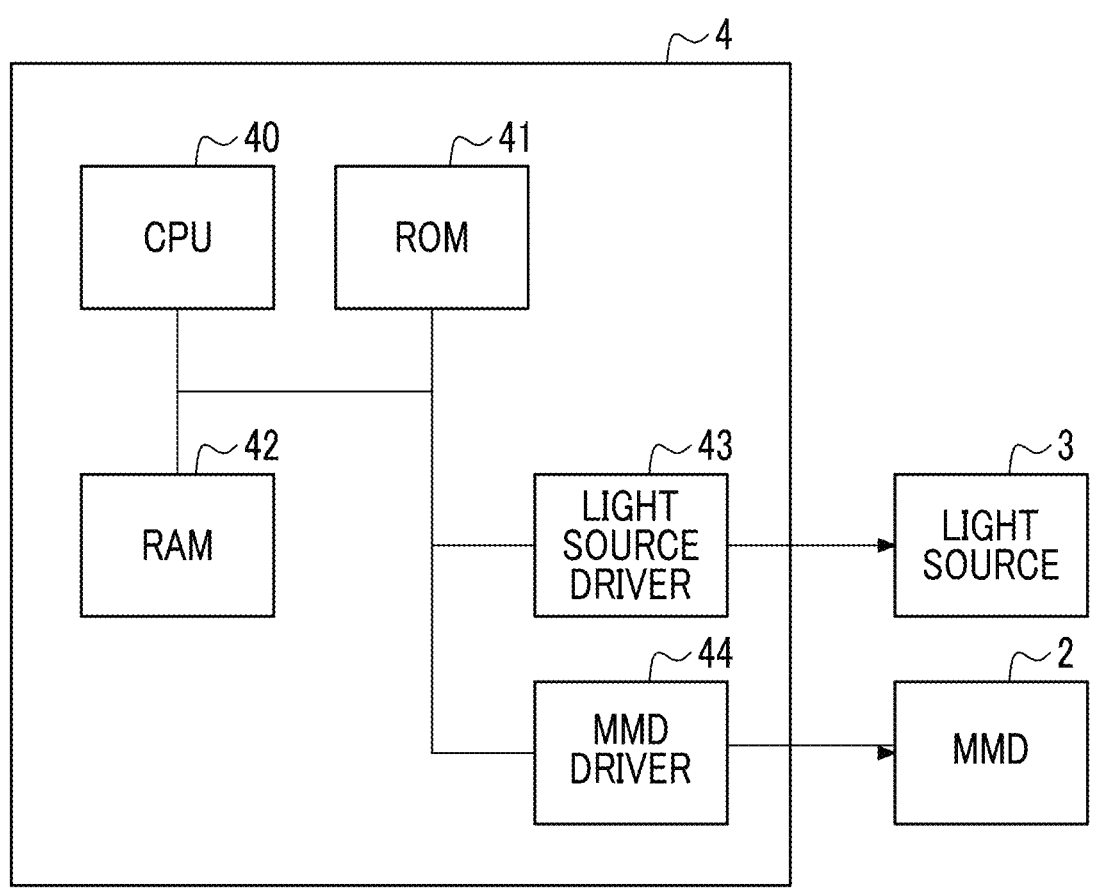
FIG. 2 is a block diagram showing an example of a hardware configuration of a driving controller.

FIG. 2 shows an example of a hardware configuration of the driving controller 4. The driving controller 4 has a central processing unit (CPU) 40, a read only memory (ROM) 41, a random access memory (RAM) 42, a light source driver 43, and an MMD driver 44. The CPU 40 is an arithmetic unit that realizes the entire function of the driving controller 4 by reading out a program and data from a storage device such as the ROM 41 into the RAM 42 and executing processing. The CPU 40 is an example of a "processor" according to the technique of the present disclosure.

The ROM 41 is a non-volatile storage device and stores a program for the CPU 40 to execute processing and data such as the optical scanning information described above. The RAM 42 is a volatile storage device that temporarily holds a program and data.

The light source driver 43 is an electric circuit that outputs a driving signal to the light source 3 under the control of the CPU 40. In the light source driver 43, the driving signal is a driving voltage for controlling the irradiation timing and the irradiation intensity of the light source 3.

The MMD driver 44 is an electric circuit that outputs a driving signal to the MMD 2 under the control of the CPU 40. In the MMD driver 44, the driving signal is a driving voltage for controlling the timing, cycle, and deflection angle for allowing the mirror portion 20 of the MMD 2 to swing.

The CPU 40 controls the light source driver 43 and the MMD driver 44 based on the optical scanning information. The optical scanning information is information including the scanning pattern of the light beam L with which the surface to be scanned 5 is scanned and the light emission timing of the light source 3.

Figure 3:
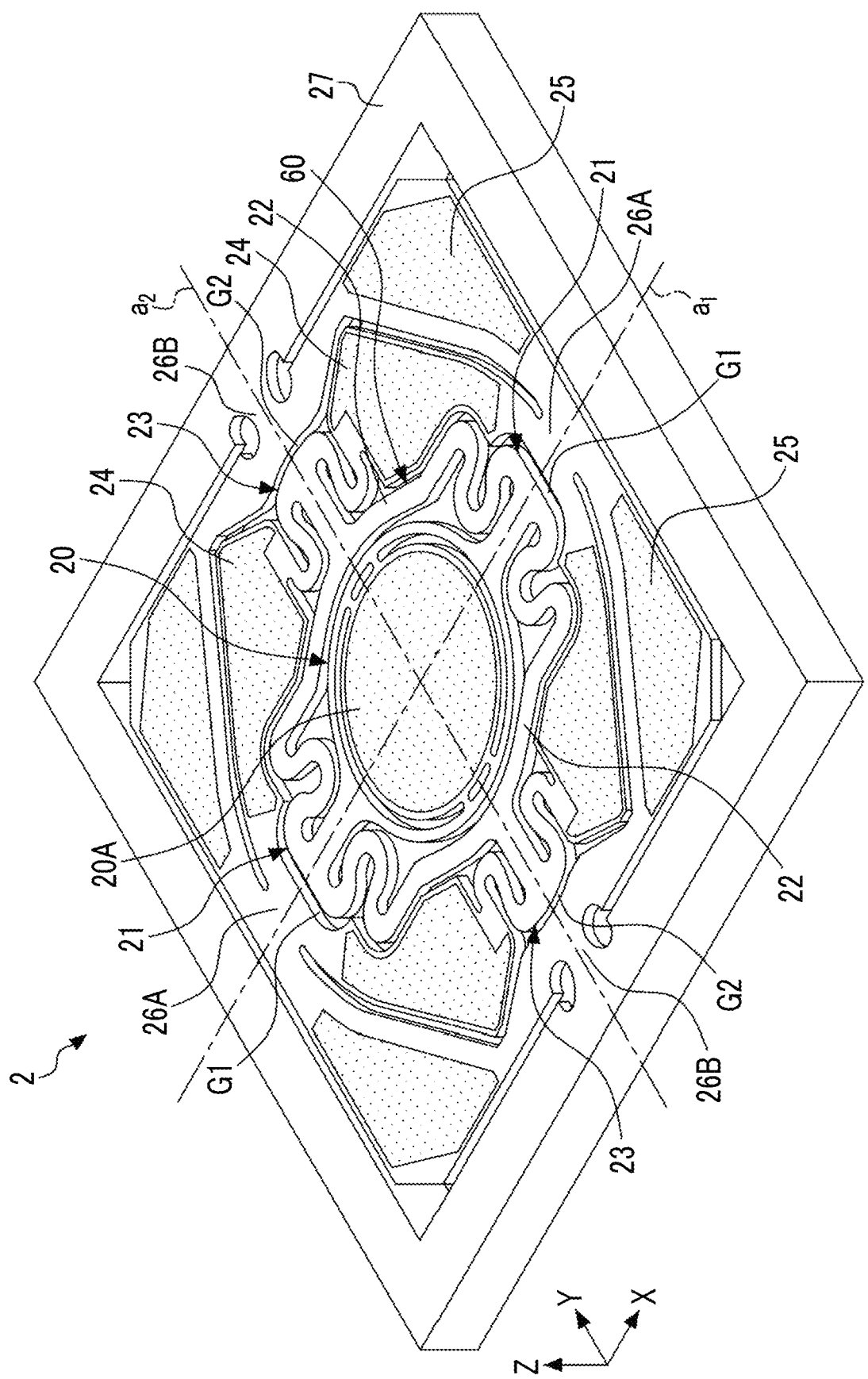
FIG. 3 is an external perspective view of a micromirror device.
Figure 4:
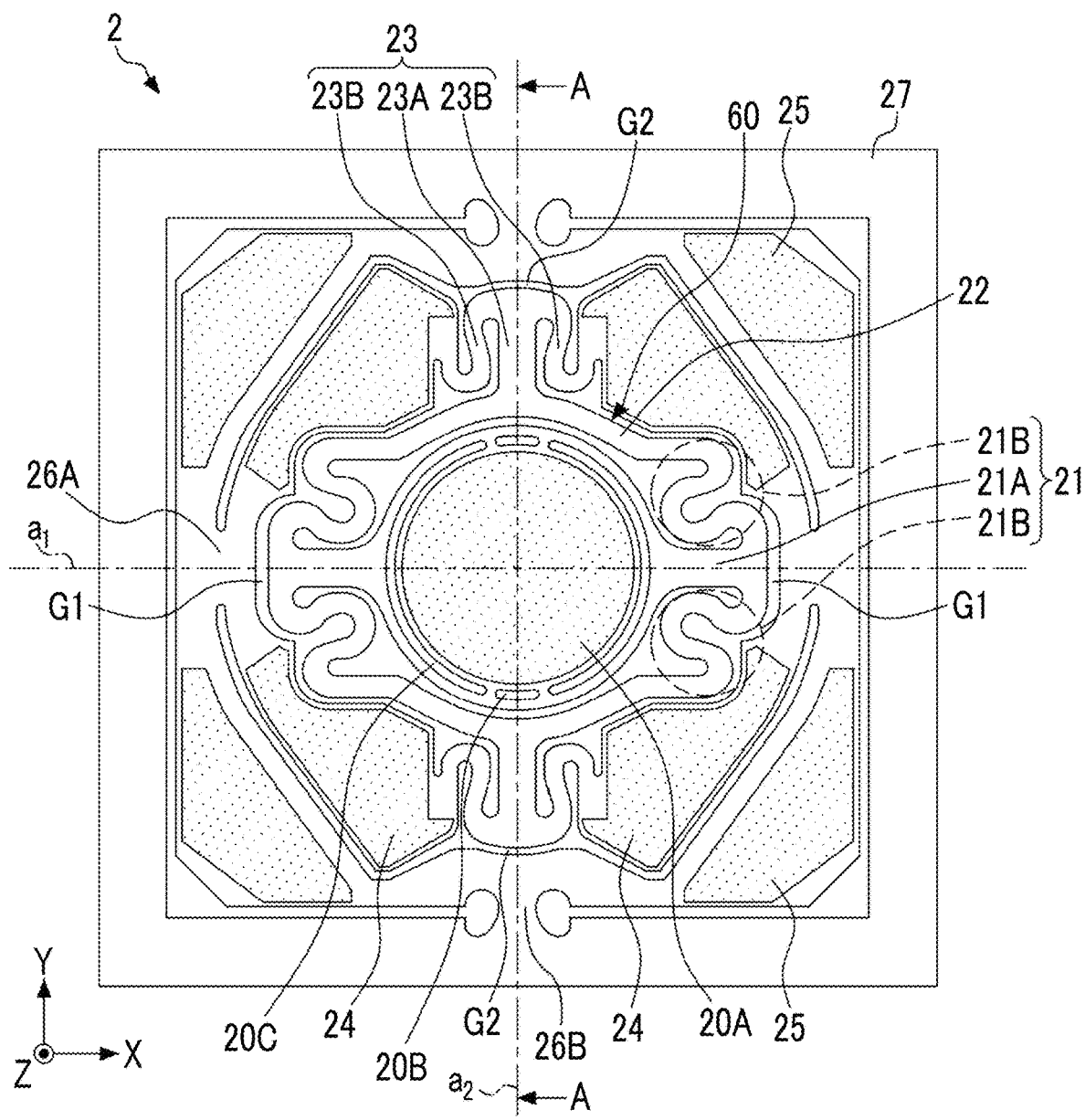
FIG. 4 is a plan view of the micromirror device as viewed from a light incident side.
Figure 5:
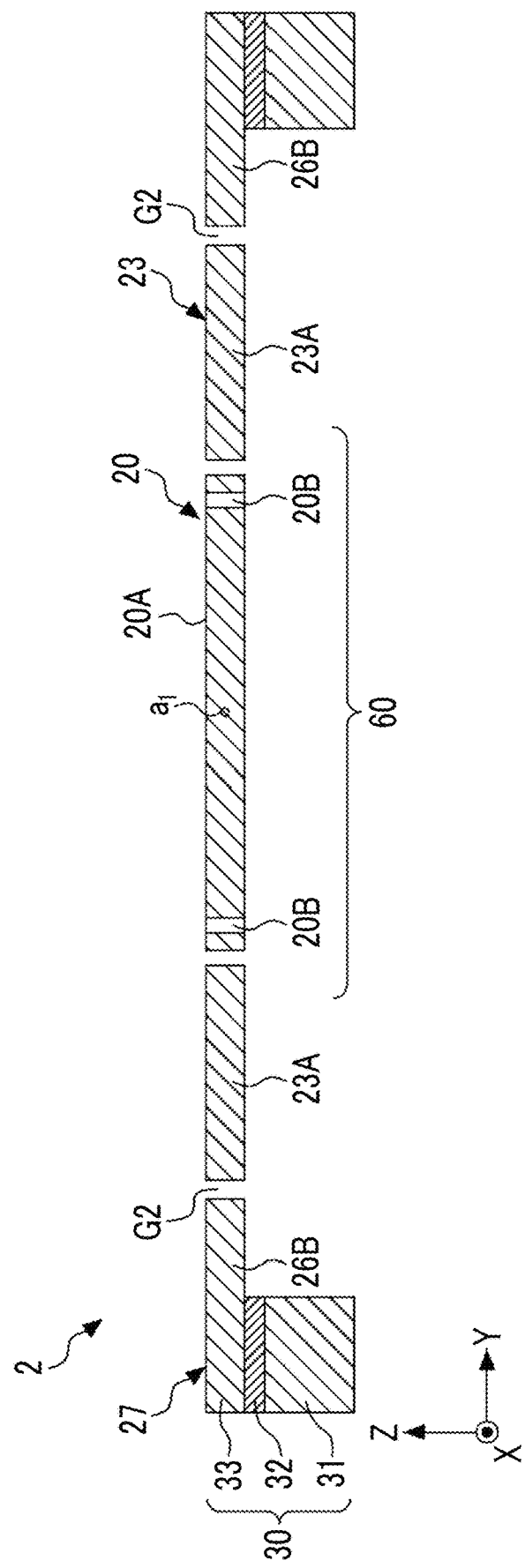
FIG. 5 is a cross-sectional view taken along the line A-A of FIG. 4.

Next, the configuration of the MMD 2 according to a first embodiment will be described with reference to FIGS. 3 to 5. FIG. 3 is an external perspective view of the MMD 2. FIG. 4 is a plan view of the MMD 2 as viewed from the light incident side. FIG. 5 is a cross-sectional view taken along the line A-A in FIG. 4.

As shown in FIG. 3, the MMD 2 has the mirror portion 20, a pair of first support portions 21, a pair of movable frames 22, a pair of second support portions 23, a pair of first actuators 24, a pair of second actuators 25, a pair of first connecting portions 26A, a pair of second connecting portions 26B, and a fixed frame 27. The MMD 2 is a so-called MEMS scanner.

The mirror portion 20 has a reflecting surface 20A for reflecting incident light. The reflecting surface 20A is formed of a metal thin film such as gold (Au) and aluminum (Al) provided on one surface of the mirror portion 20. The shape of the reflecting surface 20A is, for example, circular with the intersection of the first axis $a_1$ and the second axis $a_2$ as the center.

The first axis $a_1$ and the second axis $a_2$ exist, for example, in a plane including the reflecting surface 20A in a case where the mirror portion 20 is stationary. The planar shape of the MMD 2 is rectangular, line-symmetrical with respect to the first axis $a_1$, and line-symmetrical with respect to the second axis $a_2$.

The pair of first support portions 21 are disposed at positions facing each other across the second axis $a_2$, and have a shape that is line-symmetrical with respect to the second axis $a_2$. In addition, each of the first support portions 21 has a shape that is line-symmetrical with respect to the first axis $a_1$. The first support portion 21 is connected to the mirror portion 20 on the first axis $a_1$, and swingably supports the mirror portion 20 around the first axis $a_1$.

The pair of movable frames 22 are disposed at positions facing each other across the first axis $a_1$, and have a shape that is line-symmetrical with respect to the first axis $a_1$. Each of the movable frames 22 has a shape that is line-symmetrical with respect to the second axis $a_2$. In addition, each of the movable frames 22 is curved along the outer periphery of the mirror portion 20. Both ends of the movable frame 22 are connected to the first support portion 21.

The first support portion 21 and the movable frame 22 are connected to each other to surround the mirror portion 20. The mirror portion 20, the first support portion 21, and the movable frame 22 constitute the movable portion 60.

The pair of second support portions 23 are disposed at positions facing each other across the first axis $a_1$, and have a shape that is line-symmetrical with respect to the first axis $a_1$. Each of the second support portions 23 has a shape that is line-symmetrical with respect to the second axis $a_2$. The second support portion 23 is connected to the movable frame 22 on the second axis $a_2$, and swingably supports the movable portion 60 having the mirror portion 20 around the second axis $a_2$. In addition, both ends of the second support portion 23 are connected to the first actuator 24.

The pair of first actuators 24 are disposed at positions facing each other across the second axis $a_2$, and have a shape that is line-symmetrical with respect to the second axis $a_2$.

In addition, each of the first actuators 24 has a shape that is line-symmetrical with respect to the first axis $a_1$. The first actuator 24 is formed along the outer periphery of the movable frame 22 and the first support portion 21. The first actuator 24 is a piezoelectric drive type actuator comprising a piezoelectric element.

In FIGS. 3 and 4, although it seems that the first actuator 24 is divided in the vicinity of the first axis $a_1$, the first actuator 24 is electrically connected by a wiring line (not shown) via the first axis $a_1$.

The second support portion 23 and the first actuator 24 are connected to each other to surround the movable portion 60.

The pair of second actuators 25 are disposed at positions facing each other across the first axis $a_1$, and have a shape that is line-symmetrical with respect to the first axis $a_1$. In addition, each of the second actuators 25 has a shape that is line-symmetrical with respect to the second axis $a_2$. The second actuator 25 is formed along the outer periphery of the first actuator 24 and the second support portion 23. The second actuator 25 is a piezoelectric drive type actuator comprising a piezoelectric element.

In FIGS. 3 and 4, although it seems that the second actuator 25 is divided in the vicinity of the second axis $a_2$, the second actuator 25 is electrically connected by a wiring line (not shown) via the second axis $a_2$.

The pair of first connecting portions 26A are disposed at positions facing each other across the second axis $a_2$, and have a shape that is line-symmetrical with respect to the second axis $a_2$. In addition, each of the first connecting portions 26A has a shape that is line-symmetrical with respect to the first axis $a_1$. The first connecting portion 26A is disposed along the first axis $a_1$, and connects the first actuator 24 and the second actuator 25 on the first axis $a_1$.

The pair of second connecting portions 26B are disposed at positions facing each other across the first axis $a_1$, and have a shape that is line-symmetrical with respect to the first axis $a_1$. In addition, each of the second connecting portions 26B has a shape that is line-symmetrical with respect to the second axis $a_2$. The second connecting portion 26B is disposed along the second axis $a_2$, and connects the second actuator 25 and the fixed frame 27 on the second axis $a_2$.

The second actuator 25 and the second connecting portion 26B are connected to each other to surround the movable portion 60 and the first actuator 24. The first actuator 24 and the second actuator 25 constitute a driving portion surrounding the movable portion 60.

The fixed frame 27 is a frame-shaped member having a rectangular outer shape, and has a shape that is line-symmetrical with respect to each of the first axis $a_1$ and the second axis $a_2$. The fixed frame 27 surrounds the outer periphery of the second actuator 25 and the second connecting portion 26B. That is, the fixed frame 27 surrounds the driving portion.

The first actuator 24 and the second actuator 25 are piezoelectric actuators each having a piezoelectric element. The pair of first actuators 24 allow the movable portion 60 to swing around the second axis $a_2$ by applying rotational torque around the second axis $a_2$ to the mirror portion 20 and the movable frame 22. The pair of second actuators 25 allow the mirror portion 20 to swing around the first axis $a_1$ by applying rotational torque around the first axis $a_1$ to the mirror portion 20, the movable frame 22, and the first actuator 24.

As shown in FIG. 4, the first support portion 21 is composed of a swing shaft 21A and a pair of coupling portions 21B. The swing shaft 21A is a so-called torsion bar stretched along the first axis $a_1$. One end of the swing shaft 21A is connected to the mirror portion 20, and the other end thereof is connected to the coupling portion 21B.

On the first axis $a_1$, there is a spatial gap (hereinafter, referred to as a gap) G1 between the first support portion 21 and the driving portion.

The pair of coupling portions 21B are disposed at positions facing each other across the first axis $a_1$, and have a shape that is line-symmetrical with respect to the first axis $a_1$. One end of the coupling portion 21B is connected to the swing shaft 21A, and the other end thereof is connected to the movable frame 22. The coupling portion 21B has a folded structure. Since the coupling portion 21B has elasticity due to the folded structure, the internal stress applied to the swing shaft 21A is relaxed in a case where the mirror portion 20 swings around the first axis $a_1$.

The second support portion 23 is composed of a swing shaft 23A and a pair of coupling portions 23B. The swing shaft 23A is a so-called torsion bar stretched along the second axis $a_2$. One end of the swing shaft 23A is connected to the movable frame 22, and the other end thereof is connected to the coupling portion 23B.

On the second axis $a_2$, there is a gap G2 between the second support portion 23 and the driving portion.

The pair of coupling portions 23B are disposed at positions facing each other across the second axis $a_2$, and have a shape that is line-symmetrical with respect to the second axis $a_2$. One end of the coupling portion 23B is connected to the swing shaft 23A, and the other end thereof is connected to the first actuator 24. The coupling portion 23B has a folded structure. Since the coupling portion 23B has elasticity due to the folded structure, the internal stress applied to the swing shaft 23A is relaxed in a case where the mirror portion 20 swings around the second axis $a_2$.

In the mirror portion 20, a plurality of slits 20B and 20C are formed on the outside of the reflecting surface 20A along the outer periphery of the reflecting surface 20A. The plurality of slits 20B and 20C are disposed at positions that are line-symmetrical with respect to the first axis $a_1$ and the second axis $a_2$, respectively. The slit 20B has an effect of suppressing distortion generated on the reflecting surface 20A due to the swing of the mirror portion 20.

In FIGS. 3 and 4, the wiring line and the electrode pad for giving the driving signal to the first actuator 24 and the second actuator 25 are not shown. A plurality of the electrode pads are provided on the fixed frame 27.

As shown in FIG. 5, the MMD 2 is formed, for example, by performing an etching treatment on a silicon on insulator (SOI) substrate 30. The SOI substrate 30 is a substrate in which a silicon oxide layer 32 is provided on a first silicon active layer 31 made of single crystal silicon, and a second silicon active layer 33 made of single crystal silicon is provided on the silicon oxide layer 32.

The mirror portion 20, the first support portion 21, the movable frame 22, the second support portion 23, the first actuator 24, the second actuator 25, the first connecting portion 26A, and the second connecting portion 26B are formed of the second silicon active layer 33 remaining by removing the first silicon active layer 31 and the silicon oxide layer 32 from the SOI substrate 30 by an etching treatment. The second silicon active layer 33 functions as an elastic portion having elasticity. The fixed frame 27 is formed of three layers of the first silicon active layer 31, the silicon oxide layer 32, and the second silicon active layer 33.

The first actuator 24 includes a piezoelectric element (not shown) formed on the second silicon active layer 33. The piezoelectric element has a laminated structure in which a lower electrode, a piezoelectric film, and an upper electrode are sequentially laminated on the second silicon active layer 33. The second actuator 25 has the same configuration as the first actuator 24.

The upper electrode and the lower electrode are formed of, for example, gold (Au) or platinum (Pt). The piezoelectric film is formed of, for example, lead zirconate titanate (PZT), which is a piezoelectric material. The upper electrode and the lower electrode are electrically connected to the driving controller 4 described above via the wiring line and the electrode pad.

A driving voltage is applied to the upper electrode from the driving controller 4. The lower electrode is connected to the driving controller 4 via the wiring line and the electrode pad, and a reference potential (for example, a ground potential) is applied thereto.

In a case where a positive or negative voltage is applied to the piezoelectric film in the polarization direction, deformation (for example, expansion and contraction) proportional to the applied voltage occurs. That is, the piezoelectric film exerts a so-called inverse piezoelectric effect. The piezoelectric film exerts an inverse piezoelectric effect by applying a driving voltage from the driving controller 4 to the upper electrode, and displaces the first actuator 24 and the second actuator 25.

Figure 6:
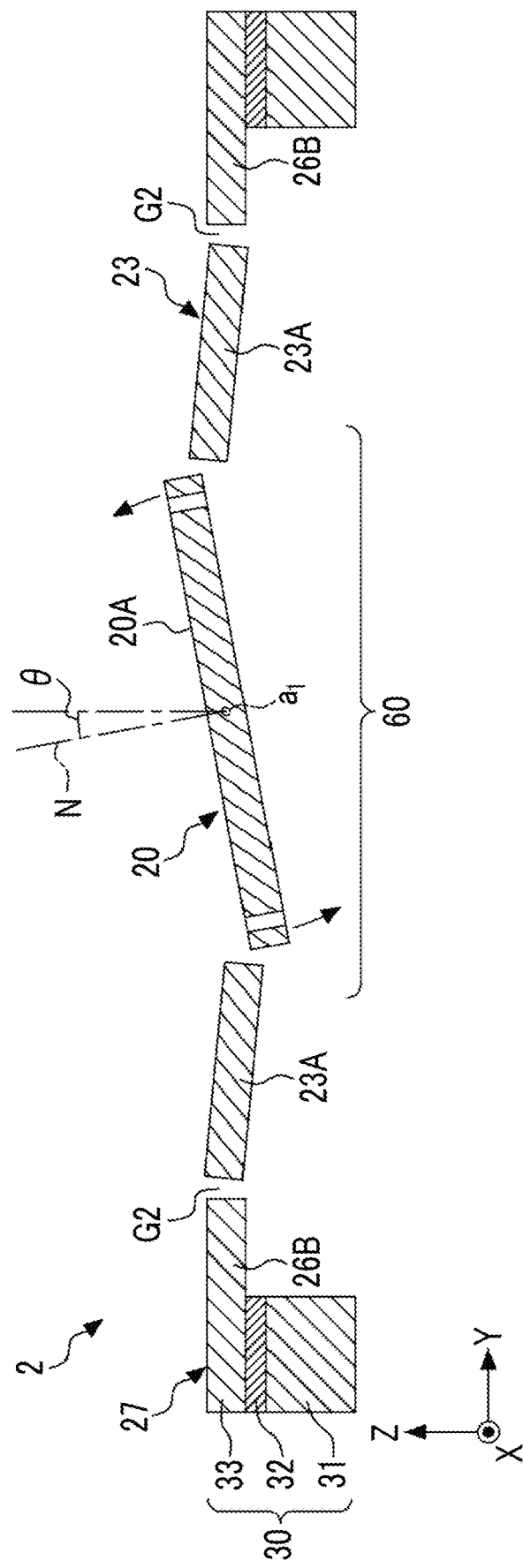
FIG. 6 is a cross-sectional view showing a state where a mirror portion rotates around a first axis.

FIG. 6 shows an example in which one piezoelectric film of the pair of second actuators 25 is extended and the other piezoelectric film is contracted, thereby generating rotational torque around the first axis $a_1$ in the second actuator 25. In this way, one of the pair of second actuators 25 and the other are displaced in opposite directions to each other, whereby the mirror portion 20 rotates around the first axis $a_1$.

In addition, FIG. 6 shows an example in which the second actuator 25 is driven in an anti-phase resonance mode (hereinafter, referred to as an anti-phase rotation mode) in which the displacement direction of the pair of second actuators 25 and the rotation direction of the mirror portion 20 are opposite to each other. On the other hand, an in-phase resonance mode in which the displacement direction of the pair of second actuators 25 and the rotation direction of the mirror portion 20 are the same direction is called an in-phase rotation mode. In the present embodiment, the second actuator 25 is driven in the anti-phase rotation mode.

A deflection angle θ of the mirror portion 20 around the first axis $a_1$ is controlled by the driving signal (hereinafter, referred to as a first driving signal) given to the second actuator 25 by the driving controller 4. The first driving signal is, for example, a sinusoidal AC voltage. The first driving signal includes a driving voltage waveform $V_{1A}(t)$ applied to one of the pair of second actuators 25 and a driving voltage waveform $V_{1B}(t)$ applied to the other. The driving voltage waveform $V_{1A}(t)$ and the driving voltage waveform $V_{1B}(t)$ are in an anti-phase with each other (that is, the phase difference is 180°).

The deflection angle θ of the mirror portion 20 around the first axis $a_1$ corresponds to an angle at which the normal line N of the reflecting surface 20A is inclined with respect to the Z direction in the YZ plane. Hereinafter, the deflection angle θ is also referred to as a rotation angle θ.

The first actuator 24 is driven in an anti-phase resonance mode in the same manner as the second actuator 25. A deflection angle of the mirror portion 20 around the second axis $a_2$ is controlled by the driving signal (hereinafter, referred to as a second driving signal) given to the first actuator 24 by the driving controller 4. The second driving signal is, for example, a sinusoidal AC voltage. The second driving signal includes a driving voltage waveform $V_{2A}(t)$ applied to one of the pair of second actuators 25 and a driving voltage waveform $V_{2B}(t)$ applied to the other. The driving voltage waveform $V_{2A}(t)$ and the driving voltage waveform $V_{2B}(t)$ are in an anti-phase with each other (that is, the phase difference is 180°).

Figure 7A:
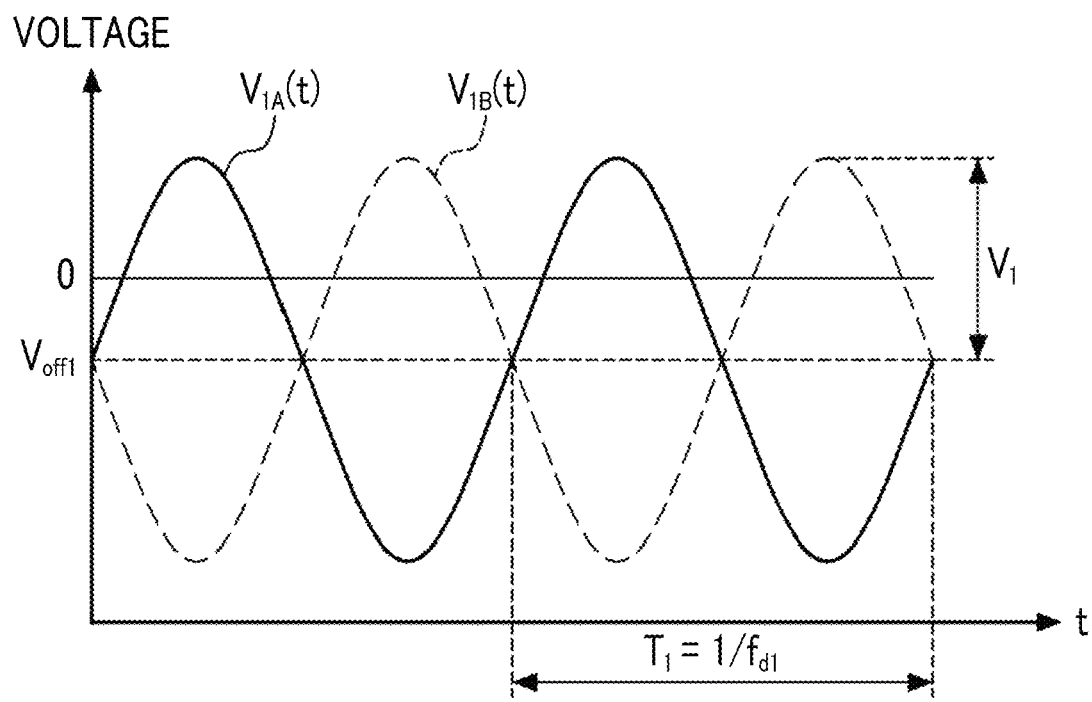
FIGS. 7A and 7B are diagrams showing examples of a first driving signal and a second driving signal.
Figure 7B:
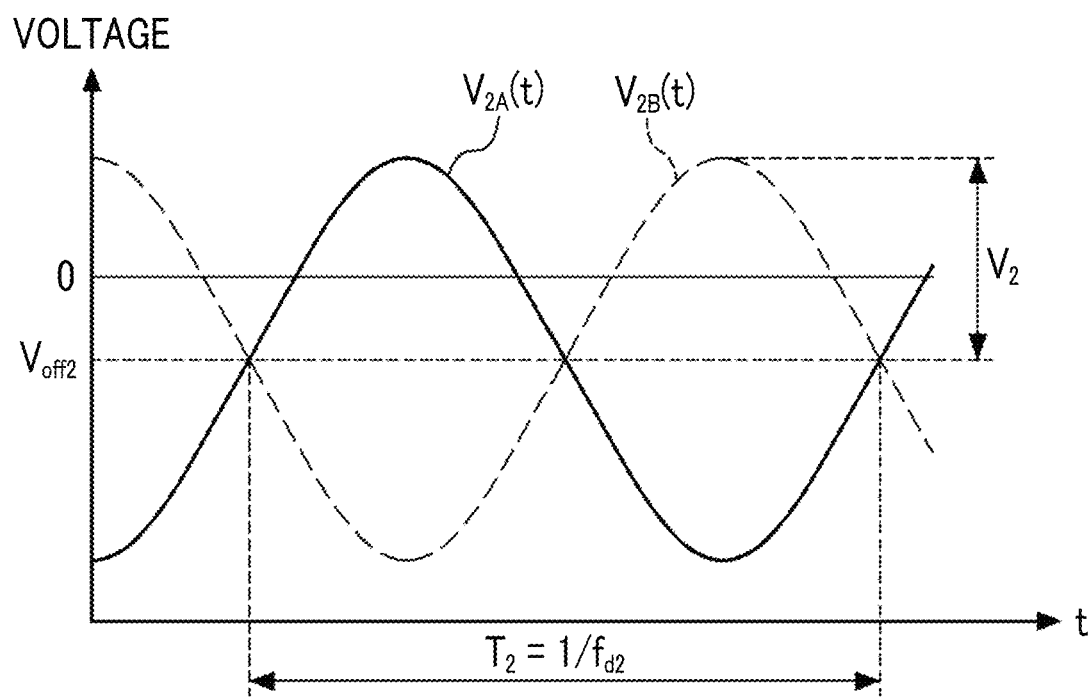

FIGS. 7A and 7B show examples of the first driving signal and the second driving signal. FIG. 7A shows the driving voltage waveforms $V_{1A}(t)$ and $V_{1B}(t)$ included in the first driving signal. FIG. 7B shows the driving voltage waveforms $V_{2A}(t)$ and $V_{2B}(t)$ included in the second driving signal.

The driving voltage waveforms $V_{1A}(t)$ and $V_{1B}(t)$ are represented as follows, respectively.

$$V_{1A}(t) = V_{off1} + V_1 \sin(2\pi f_{d1} t)$$

$$V_{1B}(t) = V_{off1} + V_1 \sin(2\pi f_{d1} t + \alpha)$$

Here, $V_1$ is the amplitude voltage. $V_{off1}$ is the bias voltage. $f_{d1}$ is the driving frequency (hereinafter, referred to as the first driving frequency). t is time. α is the phase difference between the driving voltage waveforms $V_{1A}$ (t) and $V_{1B}$ (t). In the present embodiment, for example, α=180°.

By applying the driving voltage waveforms $V_{1A}$ (t) and $V_{1B}$ (t) to the pair of second actuators 25, the mirror portion 20 swings around the first axis $a_1$ at the first driving frequency $f_{d1}$.

The driving voltage waveforms $V_{2A}$ (t) and $V_{2B}$ (t) are represented as follows, respectively.

$$V_{2A}(t)=V_{off2}+V_2 \sin(2\pi f_{d2}t+\varphi)$$

$$V_{2B}(t)=V_{off2}+V_2 \sin(2\pi f_{d2}t+\beta+\varphi)$$

Here, $V_2$ is the amplitude voltage. $V_{off2}$ is the bias voltage. $f_{d2}$ is the driving frequency (hereinafter, referred to as the second driving frequency). t is time. β is the phase difference between the driving voltage waveforms $V_{2A}$ (t) and $V_{2B}$ (t). In the present embodiment, for example, β=180°. In addition, φ is the phase difference between the driving voltage waveforms $V_{1A}$ (t) and $V_{1B}$ (t) and the driving voltage waveforms $V_{2A}$ (t) and $V_{2B}$ (t). In the present embodiment, for example, $V_{off1}=V_{off2}=0$ V.

By applying the driving voltage waveforms $V_{2A}$ (t) and $V_{2B}$ (t) to the pair of first actuators 24, the movable portion 60 including the mirror portion 20 swings around the second axis $a_2$ at the second driving frequency $f_{d2}$.

The first driving frequency $f_{d1}$ is set so as to match the resonance frequency around the first axis $a_1$ of the mirror portion 20. The second driving frequency $f_{d2}$ is set so as to match the resonance frequency around the second axis $a_2$ of the mirror portion 20. In the present embodiment, the first driving frequency $f_{d1}$ is larger than the second driving frequency $f_{d2}$.

The present applicant found that in the MMD 2 configured as described above, in a case where the displacement of the second support portion 23 satisfies a predetermined condition in a state where the mirror portion 20 rotates around the first axis $a_1$ and an absolute value of the rotation angle θ is larger than 0 degrees, the power consumption is reduced to a predetermined value or less.

Figure 8:
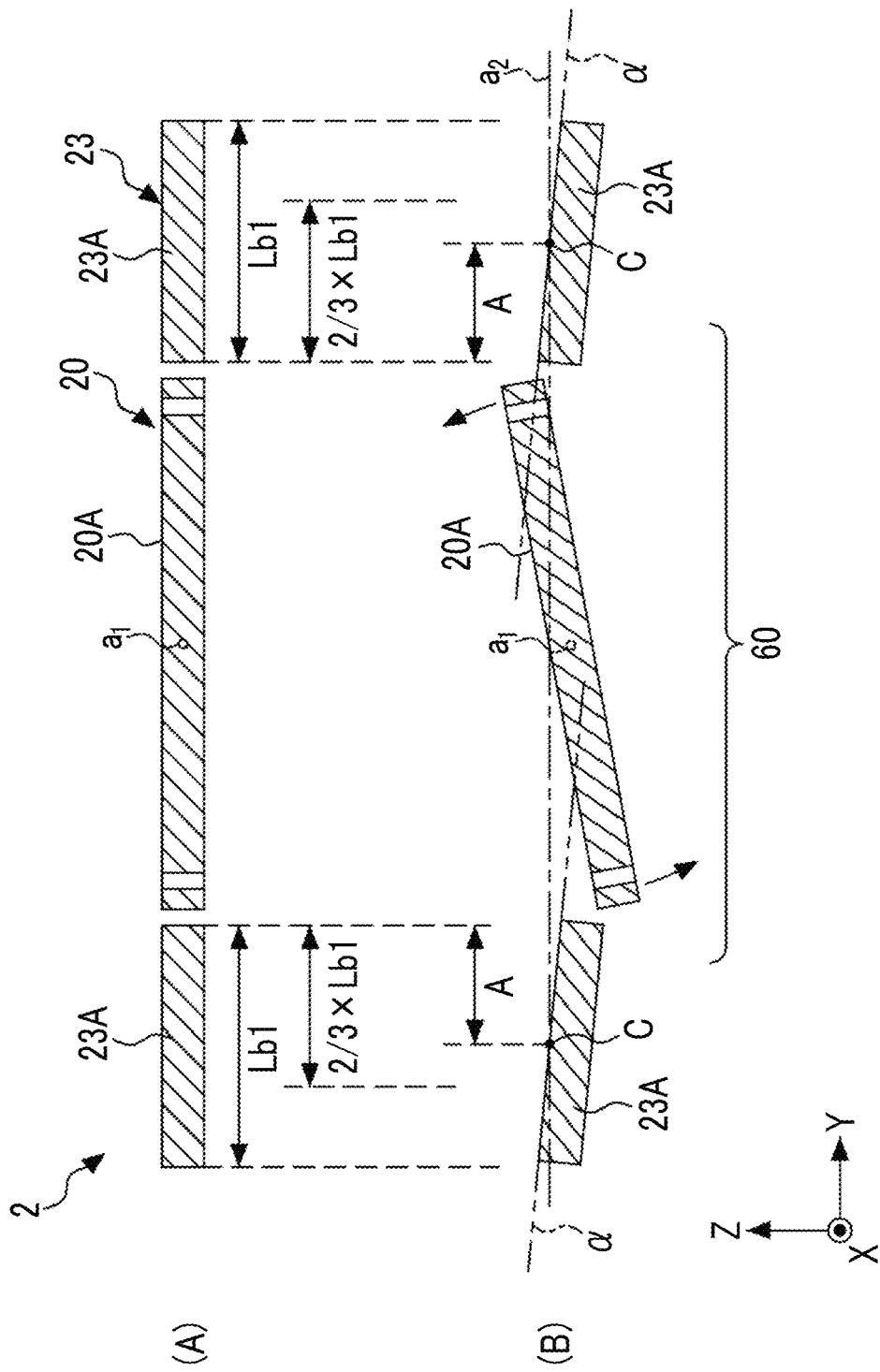
FIG. 8 is a diagram schematically showing displacement of a second support portion in a case where the mirror portion rotates around the first axis.

FIG. 8 is a diagram schematically showing displacement of the second support portion 23 in a case where the mirror portion 20 rotates around the first axis $a_1$. (A) of FIG. 8 shows a state where the mirror portion 20 is stationary and the rotation angle θ is 0 degrees. (B) of FIG. 8 shows a state where the mirror portion 20 rotates around the first axis $a_1$ and the absolute value of the rotation angle θ is larger than 0 degrees.

FIG. 8 shows a cross-sectional view of the MMD 2 cut along a plane orthogonal to the first axis $a_1$ and including the second axis $a_2$. A straight line α and an intersection C shown in (B) of FIG. 8 are included in the cross section of the MMD 2. Specifically, the straight line α is a straight line located on the surface of the second support portion 23 and including each end point of the second support portion 23. The intersection C is a point where the straight line α intersects the second axis $a_2$.

The total length of the second support portion 23 in the direction of the second axis $a_2$ in the stationary state is denoted by Lb1. In addition, in the direction of the second axis $a_2$, the distance from an end part of the second support portion 23 on the mirror portion 20 side in the stationary state to the intersection C is denoted by A. Through the experiment described below, the present applicant found that in a case where the distance A is ⅔ times or less the total length Lb1 (that is, in a case of A≤⅔×Lb1), the power consumption is reduced to 50 mW or less.

In the experiment described below, the present applicant prepared a plurality of samples having different distances A for the MMD 2, and measured the power consumption of each sample using a current probe in a state where the sample was resonated by one-dimensional driving around the first axis $a_1$.

Generally, in a case where the micromirror device is driven resonantly, a crosstalk between axes is generated in which the swing of the mirror portion around one of the first axis and the second axis affects the swing of the mirror portion around the other axis. Specifically, according to the size of a rotation angle around the one axis, a resonance frequency around the other axis shifts. As a result, the stability of the two-dimensional optical scanning is significantly reduced.

For example, in a case where a driving frequency around the one axis is swept to bring the driving frequency closer to the resonance frequency to increase a deflection angle of the mirror portion, a deflection angle of the mirror portion around the other axis is greatly changed by the shift of the resonance frequency caused by the crosstalk between axes. In this case, a change in the deflection angle of the mirror portion around the other axis causes a shift of the resonance frequency around the axis on a side where the driving frequency is swept. That is, the crosstalk between axes causes a kind of feedback phenomenon.

In this way, in a case where a shift amount of the resonance frequency by the crosstalk between axes is large, even though the driving frequency is swept, there are problems that the driving frequency cannot be adjusted to the resonance frequency due to the feedback phenomenon, and that the deflection angle of the mirror portion cannot be increased.

Therefore, the shift amount of the resonance frequency by the crosstalk between axes was measured by driving each sample prepared for the MMD 2. Specifically, a resonance frequency around the first axis $a_1$ in a case where each sample is driven one-dimensionally around the first axis $a_1$ (hereinafter, referred to as a first resonance frequency fr1) and a resonance frequency around the first axis $a_1$ in a case where each sample is driven two-dimensionally around the first axis $a_1$ and the second axis $a_2$ (hereinafter, referred to as a second resonance frequency fr2) were measured. Then, a shift amount Δfr of the resonance frequency by the crosstalk between axes was obtained by calculating a difference between the first resonance frequency fr1 and the second resonance frequency fr2.

Figure 9:
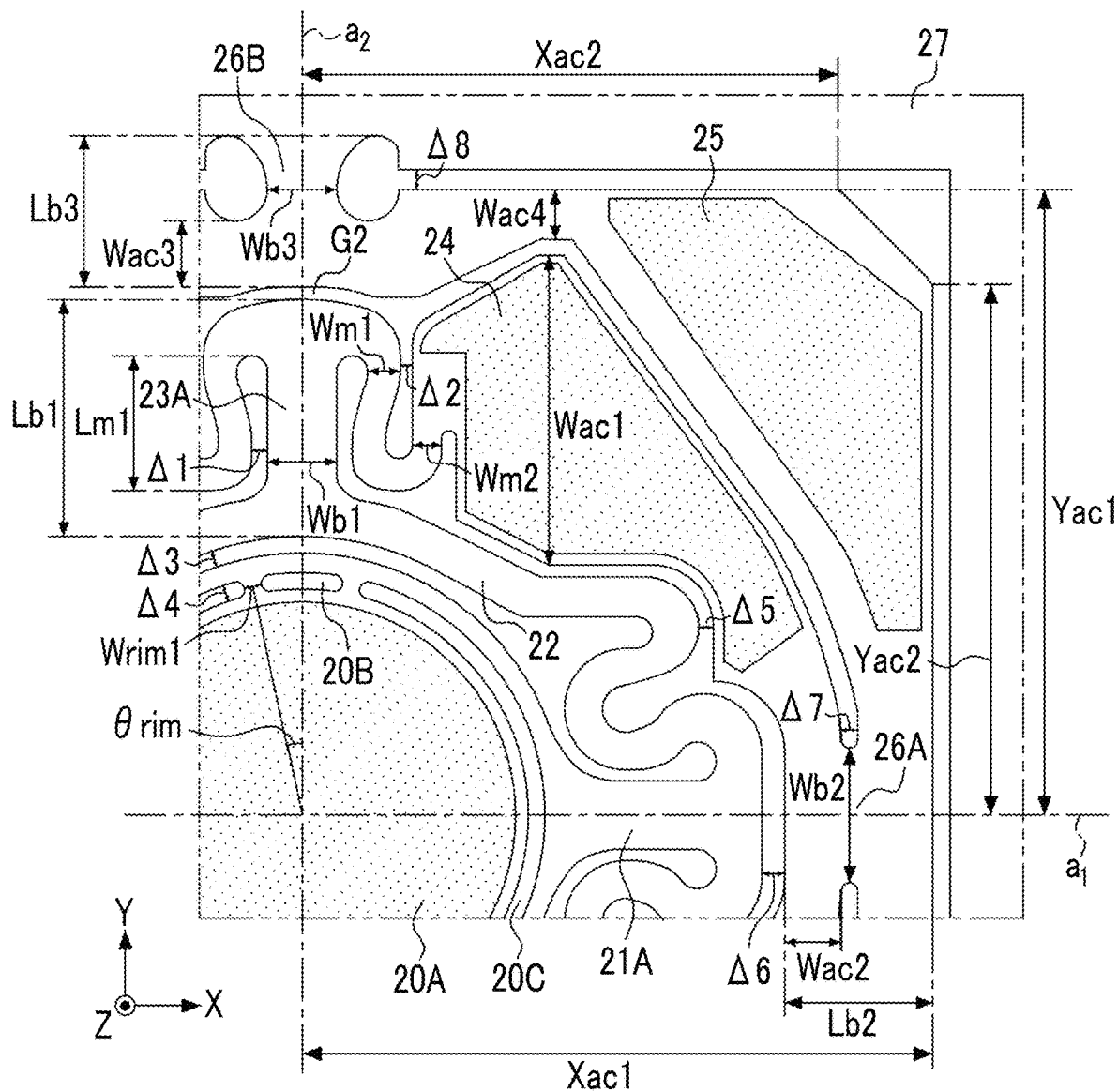
FIG. 9 is a diagram showing parameters relating to dimensions of components of the micromirror device.
Figure 10:
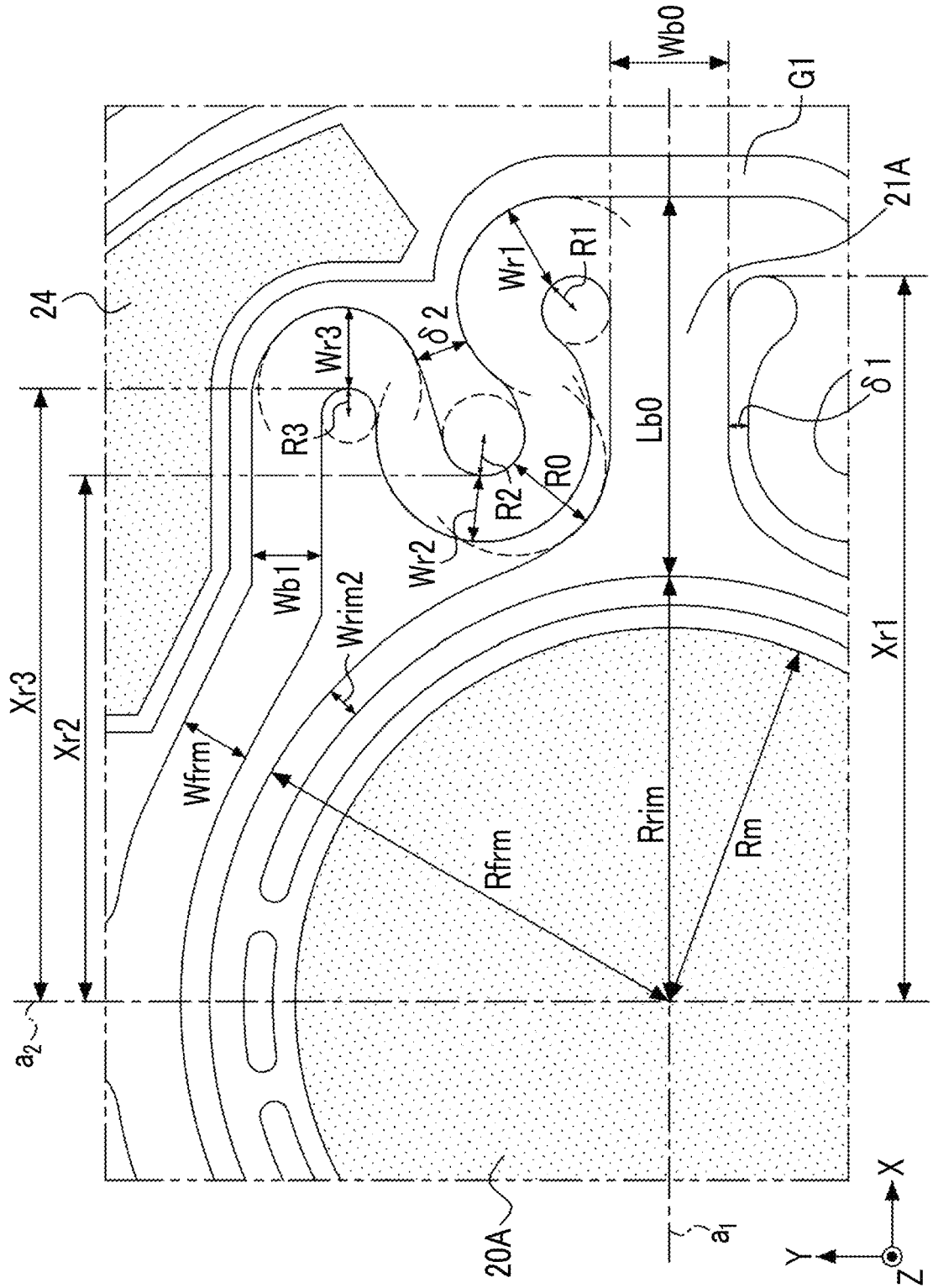
FIG. 10 is a diagram showing parameters relating to dimensions of components of the micromirror device.

FIGS. 9 and 10 show parameters relating to the width, length, and the like of the components of the sample used in the experiment. FIG. 11 is a diagram showing specific setting values of the parameters.

The diameter of the mirror portion 20 was 1.5 mm, the thickness of the SOI substrate 30 was 430 μm, the thickness of the second silicon active layer 33 was 60 μm, and the thickness of the silicon oxide layer 32 was 40 μm. The length of one side of the fixed frame 27 was 5.2 mm.

The present applicant used Xac2 and Yac2 as variables among the parameters shown in FIG. 11. That is, the present applicant prepared a plurality of samples having different distances A by changing the lengths of Xac2 and Yac2 for each sample.

Modification Example

As Modification Example, the present applicant prepared samples for an MMD 2A in which the shape and the like of the components are different from those of the MMD 2 according to the above embodiment.

Figure 12:
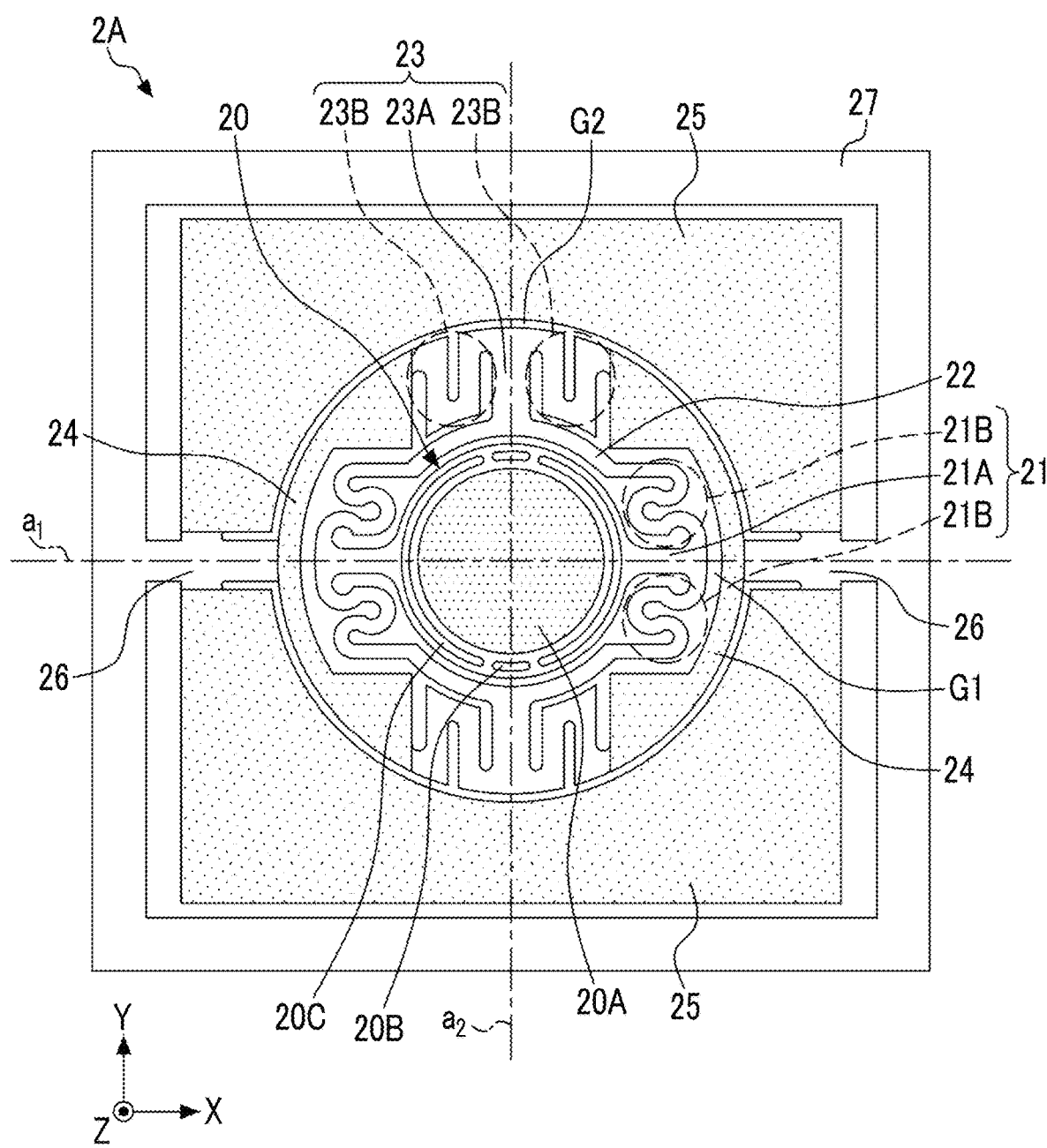
FIG. 12 is a plan view of a micromirror device according to Modification Example.

FIG. 12 shows the configuration of the MMD 2A according to Modification Example. In FIG. 12, the components having the same functions as those of the MMD 2 according to the above embodiment are designated by the same reference numerals. In the MMD 2A, a connecting portion 26 is provided instead of the first connecting portion 26A and the second connecting portion 26B. The connecting portion 26 is provided on the first axis $a_1$, and connects the first actuator 24 to the second actuator 25 and connects the second actuator 25 to the fixed frame 27.

Figure 13:
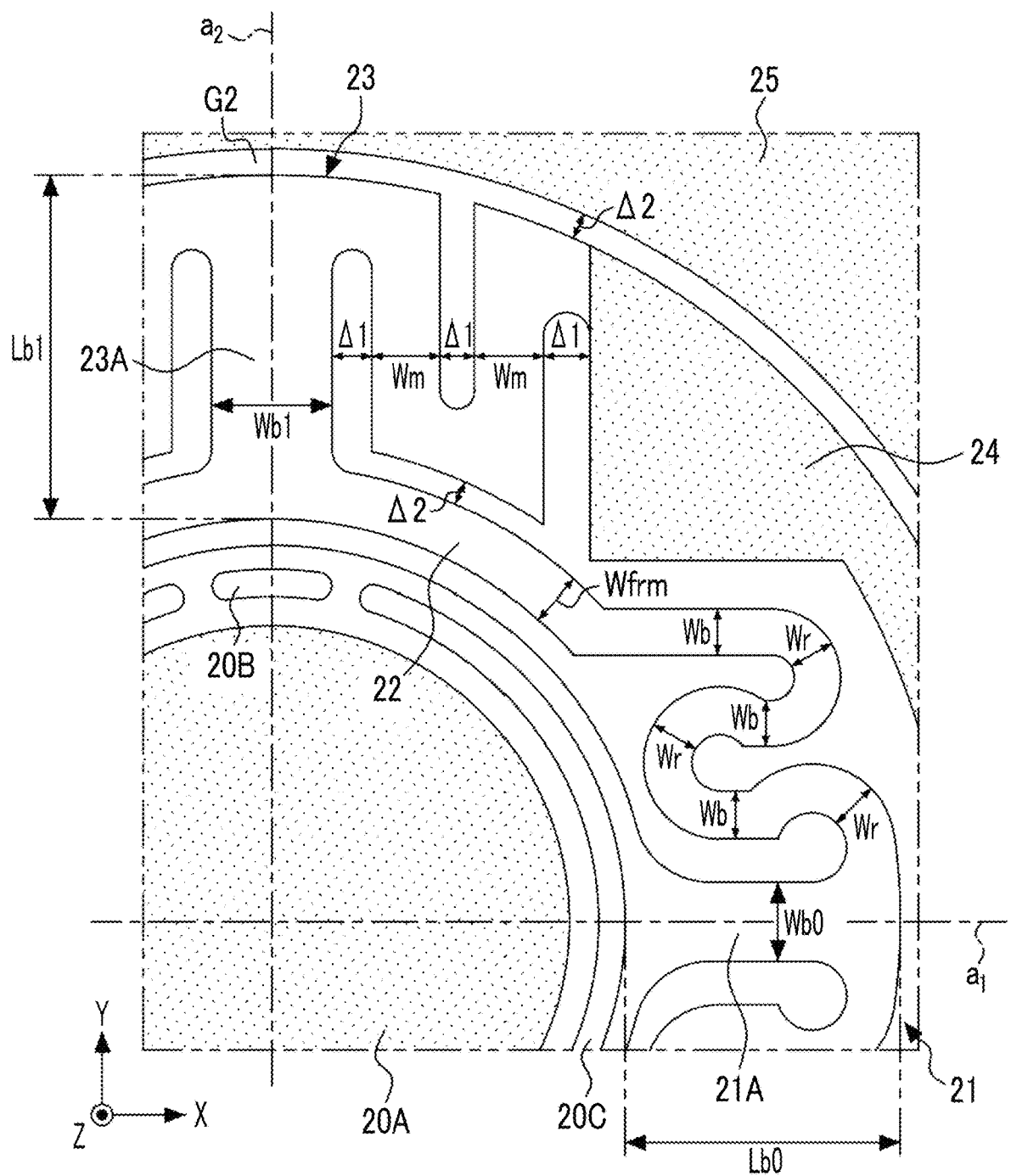
FIG. 13 is a diagram showing parameters relating to dimensions of components of the micromirror device according to Modification Example.
Figure 14:
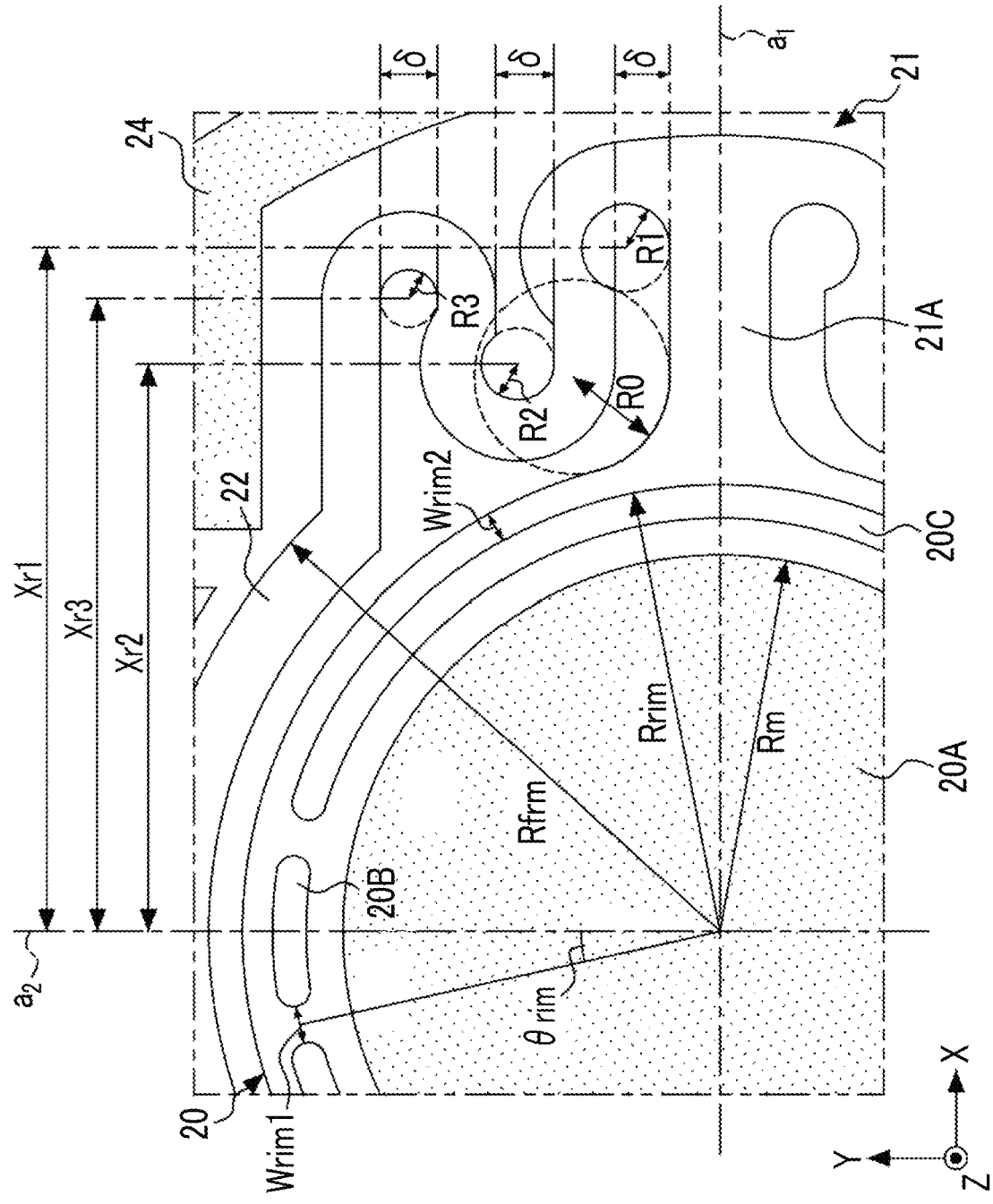
FIG. 14 is a diagram showing parameters relating to dimensions of components of the micromirror device according to Modification Example.
Figure 15:
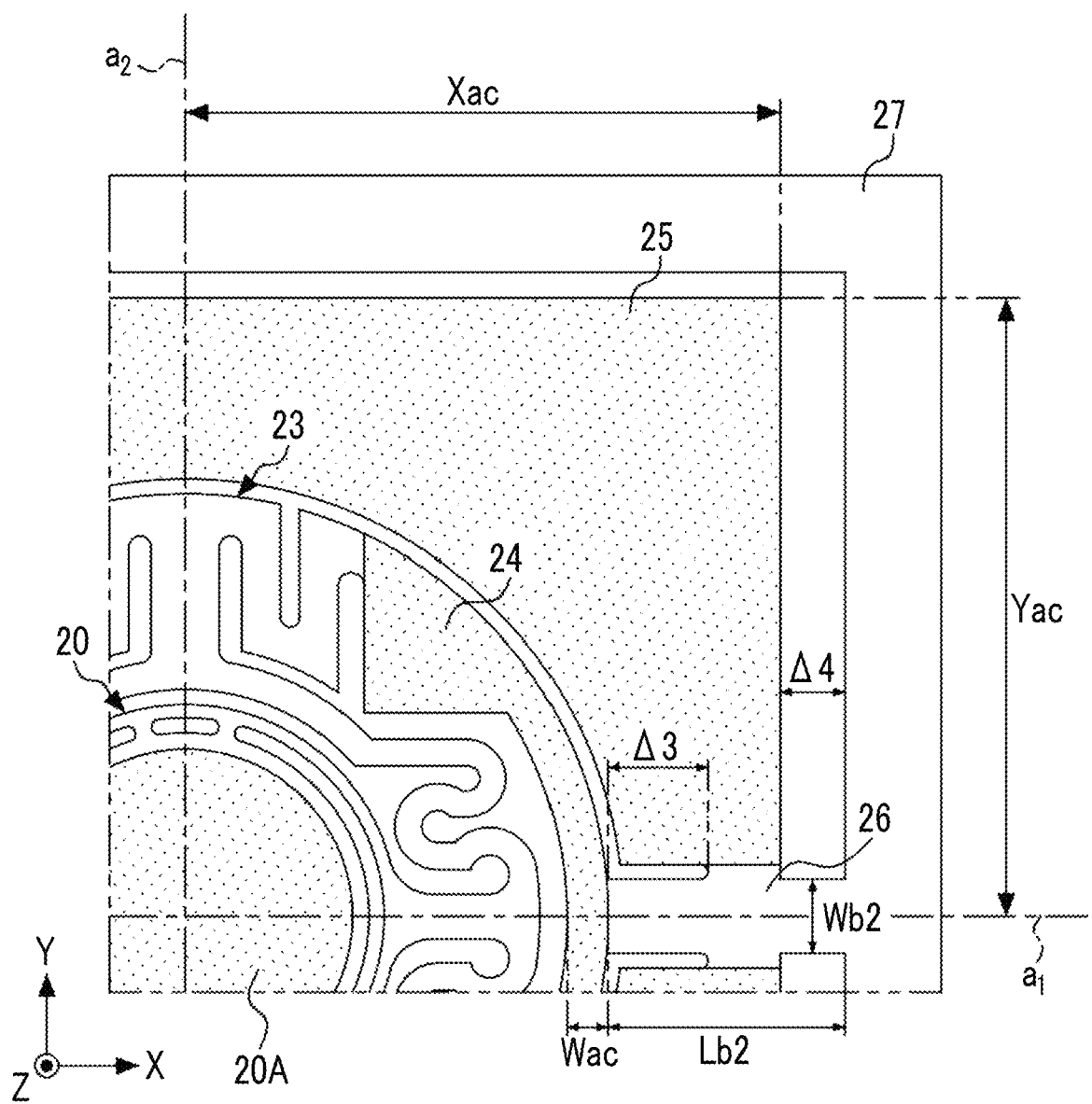
FIG. 15 is a diagram showing parameters relating to dimensions of components of the micromirror device according to Modification Example.

FIGS. 13 to 15 show parameters relating to the width, length, and the like of the components of the MMD 2A. FIG. 16 is a diagram showing specific setting values of the parameters.

In Modification Example, the diameter of the mirror portion 20 was 1.5 mm, the thickness of the SOI substrate 30 was 350 μm, the thickness of the second silicon active layer 33 is 60 μm, and the thickness of the silicon oxide layer 32 was 65 μm. The length of one side of the fixed frame 27 was 5.2 mm.

Experimental Result

For the above-described embodiment and modification example, each sample was driven in a vacuum chamber to measure the first resonance frequency fr1 and the second resonance frequency fr2. Specifically, the driving frequency was swept while irradiating the mirror portion 20 during driving with laser light, and the driving frequency at which a spreading angle of reflected light was maximized was measured as the resonance frequency. In addition, the deflection angle of the mirror portion 20 was calculated from the spreading angle of the reflected light.

FIG. 17 shows measurement results of the first resonance frequency fr1 and the second resonance frequency fr2 for each sample. Sample number 1 indicates a sample prepared for the MMD 2A according to Modification Example. Sample numbers 2 to 7 indicate samples prepared for the MMD 2 according to the embodiment. Sample numbers 2 to 7 have different lengths of Xac2 and Yac2.

The first resonance frequency fr1 is a resonance frequency during one-dimensional driving in a case where the deflection angle of the mirror portion 20 around the first axis $a_1$ is ±1.25 degrees. The second resonance frequency fr2 is a resonance frequency during two-dimensional driving in a case where the deflection angle of the mirror portion 20 around the first axis $a_1$ is ±1.25 degrees and the deflection angle of the mirror portion 20 around the second axis $a_2$ is ±11.5 degrees. The shift amount Δfr of the resonance frequency is a value obtained by subtracting the first resonance frequency fr1 from the second resonance frequency fr2.

The distance A was measured for each sample using a laser Doppler vibrometer. Then, using the measured distance A, a ratio A/Lb1 of the distance A to the total length Lb1 of the second support portion 23 was calculated.

In a case where an application to a laser display for AR glasses is considered, the superiority can be secured in a case where the deflection angle of the mirror portion 20 around each axis during the two-dimensional driving is ±8.5 degrees or more around the first axis $a_1$ and ±5.65 degrees or more around the second axis $a_2$. Therefore, for each sample, it was determined whether or not the deflection angle was within the above-described range and the two-dimensional driving was possible stably for 60 seconds or longer. The term "OK" indicates that the stable two-dimensional driving for 60 seconds or longer was possible. The term "NG" indicates that the stable two-dimensional driving for 60 seconds or longer was not possible.

According to FIG. 17, it can be seen that in a case where the ratio A/Lb1 is 19/50 or more (0.38 or more), the two-dimensional driving is stabilized and the superiority can be obtained from the viewpoint of an application to a general laser display.

The power consumption is a value measured using a current probe in a state where the sample was resonated by the one-dimensional driving around the first axis $a_1$. In this case, the deflection angle of the mirror portion 20 around the first axis $a_1$ was ±17 degrees.

Figure 18:
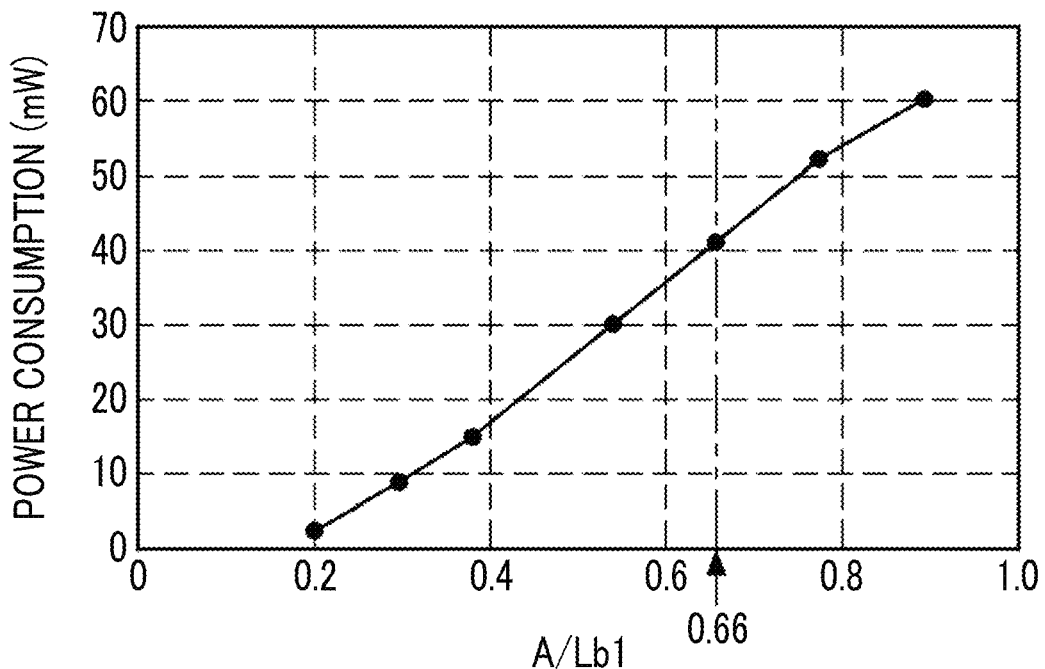
FIG. 18 is a graph showing dependence of power consumption on a ratio A/Lb1.

FIG. 18 is a graph showing dependence of power consumption on the ratio A/Lb1. Generally, low power consumption is desirable for an application of a laser display for AR glasses. As a guide, in a case where the power consumption during the one-dimensional driving is 50 mW or less, the superiority as an application of a laser display for AR glasses can be secured. According to FIG. 18, it can be seen that in a case where the ratio A/Lb1 is 2/3 or less, the power consumption is reduced to 50 mW or less, and the superiority can be obtained from the viewpoint of an application to a laser display for AR glasses.

This reduction in the power consumption is also attributable to the fact that the presence of the gap G2 between the second support portion 23 and the driving portion suppresses a decrease in a Q value during driving around the first axis $a_1$.

Figure 19:
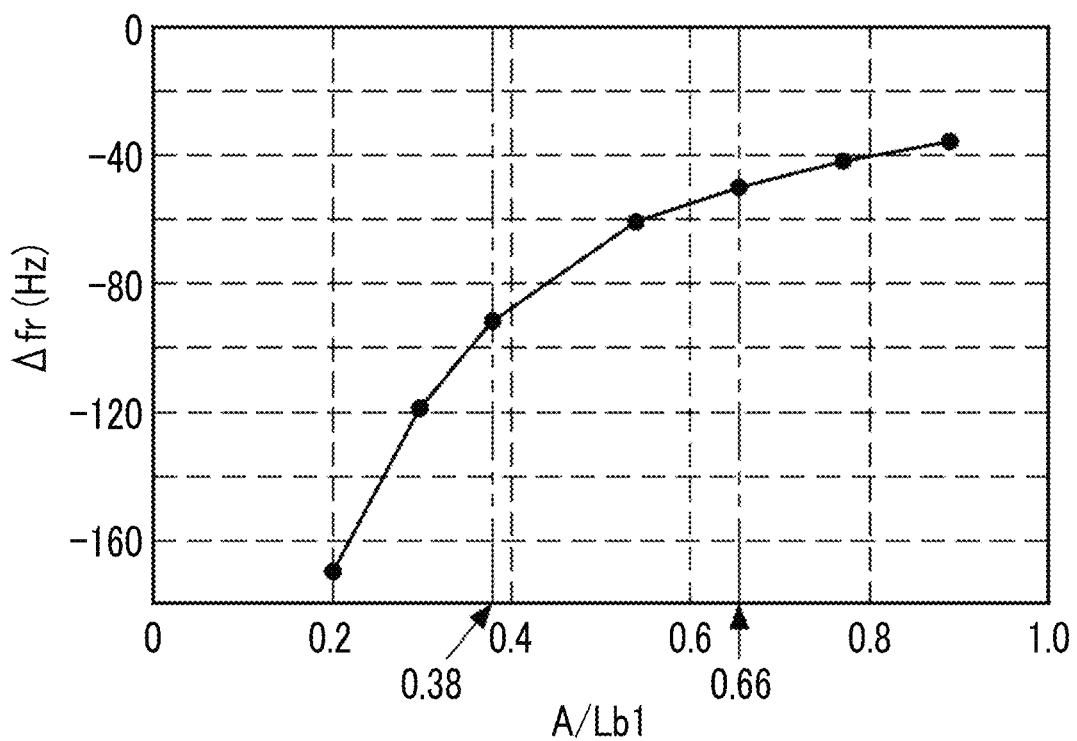
FIG. 19 is a graph showing dependence of a shift amount of a resonance frequency on the ratio A/Lb1.

FIG. 19 is a graph showing dependence of the shift amount Δfr of the resonance frequency on the ratio A/Lb1. According to FIG. 19, it can be seen that the larger the ratio A/Lb1, the smaller the shift amount Δfr of the resonance frequency. The small shift amount Δfr means that an absolute value of the shift amount Δfr is small.

That is, from the viewpoint of the power consumption, it is preferable that the ratio A/Lb1 satisfies a relationship of A/Lb1≤2/3. Further, from the viewpoint of the power consumption and the stability of the two-dimensional driving, it is preferable that the ratio A/Lb1 satisfies a relationship of 19/50≤A/Lb1≤2/3.

Figure 20:
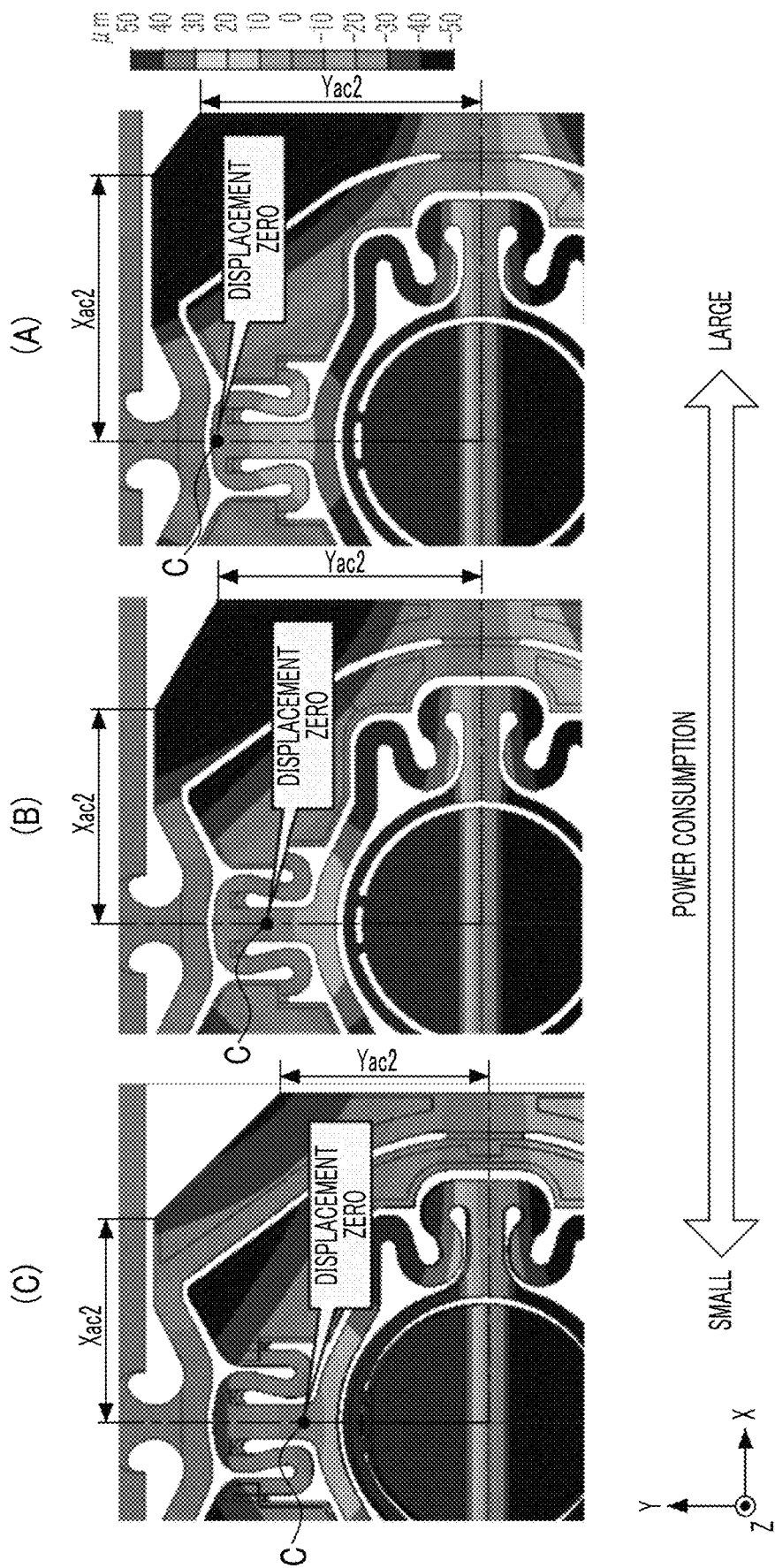
FIG. 20 is a diagram showing simulation results.

FIG. 20 shows the simulation results. (A) to (C) of FIG. 20 show that the lengths of Xac2 and Yac2 are different. The intersection C corresponds to a point where the displacement of the second support portion 23 is zero. It can be seen that the position of the intersection C changes (that is, the distance A changes) according to the lengths of Xac2 and Yac2. Also in the simulation, it was confirmed that the smaller the ratio A/Lb1, the smaller the power consumption.

In the above embodiment, the hardware configuration of the driving controller 4 can be variously modified. The processing unit of the driving controller 4 may be composed of one processor or may be composed of a combination of two or more processors of the same type or different types. The processor includes, for example, a CPU, a programmable logic device (PLD), or a dedicated electric circuit. As is well known, the CPU is a general-purpose processor that executes software (program) to function as various processing units. The PLD is a processor such as a field programmable gate array (FPGA) whose circuit configuration can be changed after manufacture. The dedicated electric circuit is a processor that has a dedicated circuit configuration designed to perform a specific process, such as an application specific integrated circuit (ASIC).

All documents, patent applications, and technical standards mentioned in this specification are incorporated herein by reference to the same extent as in a case where each document, each patent application, and each technical standard are specifically and individually described by being incorporated by reference.

What is claimed is:

1. A micromirror device comprising:
   a mirror portion on which a reflecting surface for reflecting incident light is formed;
   a first support portion that is connected to the mirror portion on a first axis located in a plane including the reflecting surface of the mirror portion in a stationary state, and that swingably supports the mirror portion around the first axis;
   a pair of movable frames that are connected to the first support portion and face each other across the first axis;
   a second support portion that is connected to the movable frame on a second axis which is located in the plane including the reflecting surface of the mirror portion in the stationary state and is orthogonal to the first axis, and that swingably supports a movable portion including the mirror portion, the first support portion, and the movable frame around the second axis;
   a driving portion that surrounds the movable portion and has a gap with the second support portion on the second axis;
   a coupling portion that couples the second support portion and the driving portion; and
   a fixed frame that is connected to the driving portion and surrounds the driving portion,
   wherein, in a state where the mirror portion rotates around the first axis and an absolute value of a rotation angle is larger than 0 degrees,
   assuming that, in a plane orthogonal to the first axis and including the second axis, a distance between an intersection between the second axis and a straight line located on a surface of the second support portion and including each end point of the second support portion and an end part of the second support portion on a mirror portion side in the stationary state is denoted by A, and a total length of the second support portion in a direction of the second axis is denoted by L, a relationship of $A/L \le 2/3$ is satisfied.

2. The micromirror device according to claim 1, wherein the driving portion has a piezoelectric element.

3. The micromirror device according to claim 1, wherein the driving portion includes
   a pair of first actuators facing each other across the second axis and having a piezoelectric element, and
   a pair of second actuators surrounding the first actuator, facing each other across the first axis, and having a piezoelectric element.

4. The micromirror device according to claim 3, wherein the second actuator allows the mirror portion to swing around the first axis, and
   the first actuator allows the movable portion to swing around the second axis.

5. The micromirror device according to claim 1, wherein the distance A and the total length L satisfy a relationship of $19/50 \le A/L \le 2/3$.

6. An optical scanning device comprising:
   the micromirror device according to claim 1; and
   a processor that drives the driving portion,
   wherein the processor allows the mirror portion to swing around the first axis and the second axis by providing a driving signal to the driving portion.

* * * * *